No. 647,944. Patented Apr. 24, 1900.
M. D. COMPTON.
TIDE POWER.
(Application filed Jan. 22, 1900.)
(No Model.) 2 Sheets—Sheet 1.
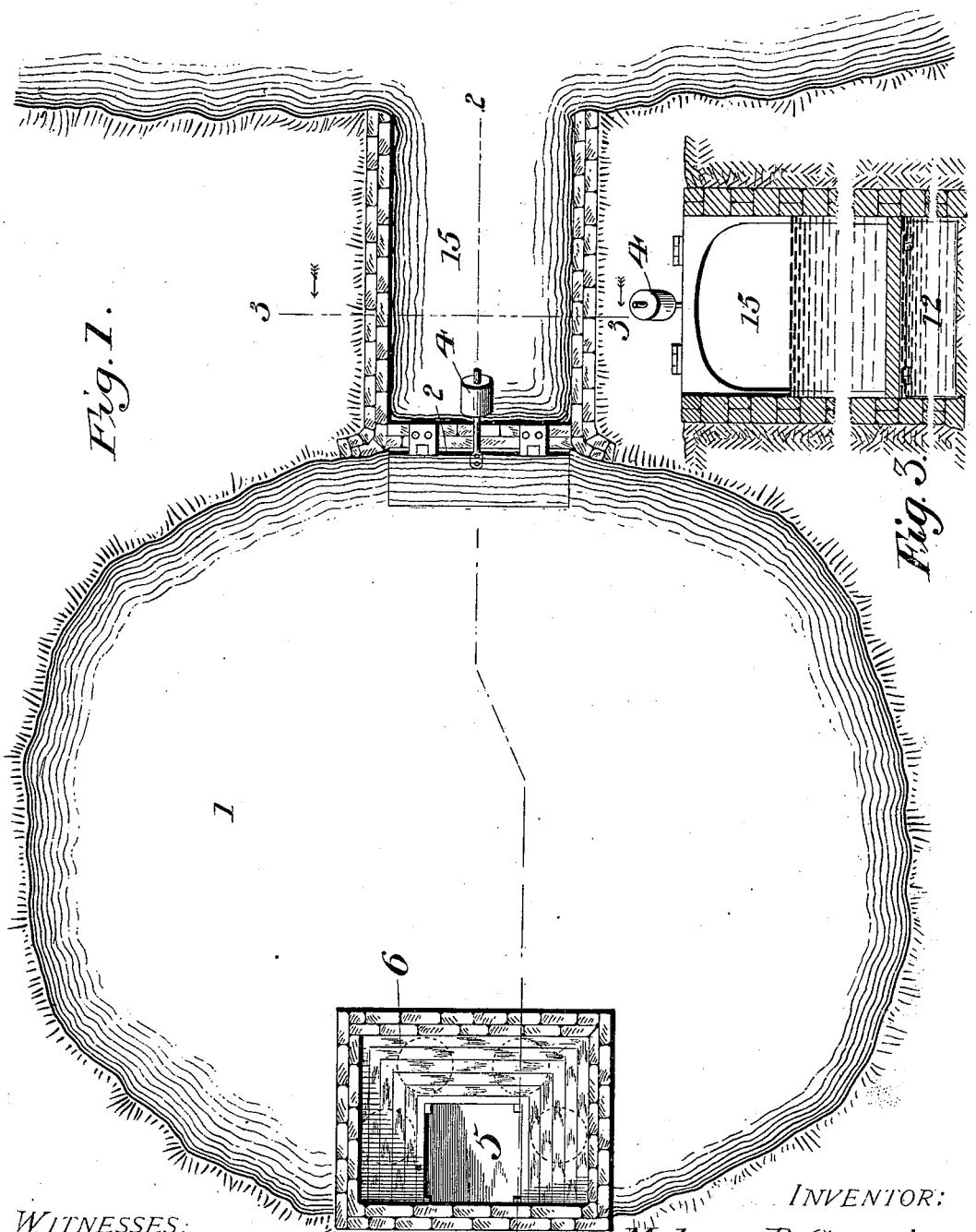
WITNESSES:
L. C. Hills
E. E. Lodge
INVENTOR:
Melvin D. Compton,
BY V. D. Stockbridge
Attorney

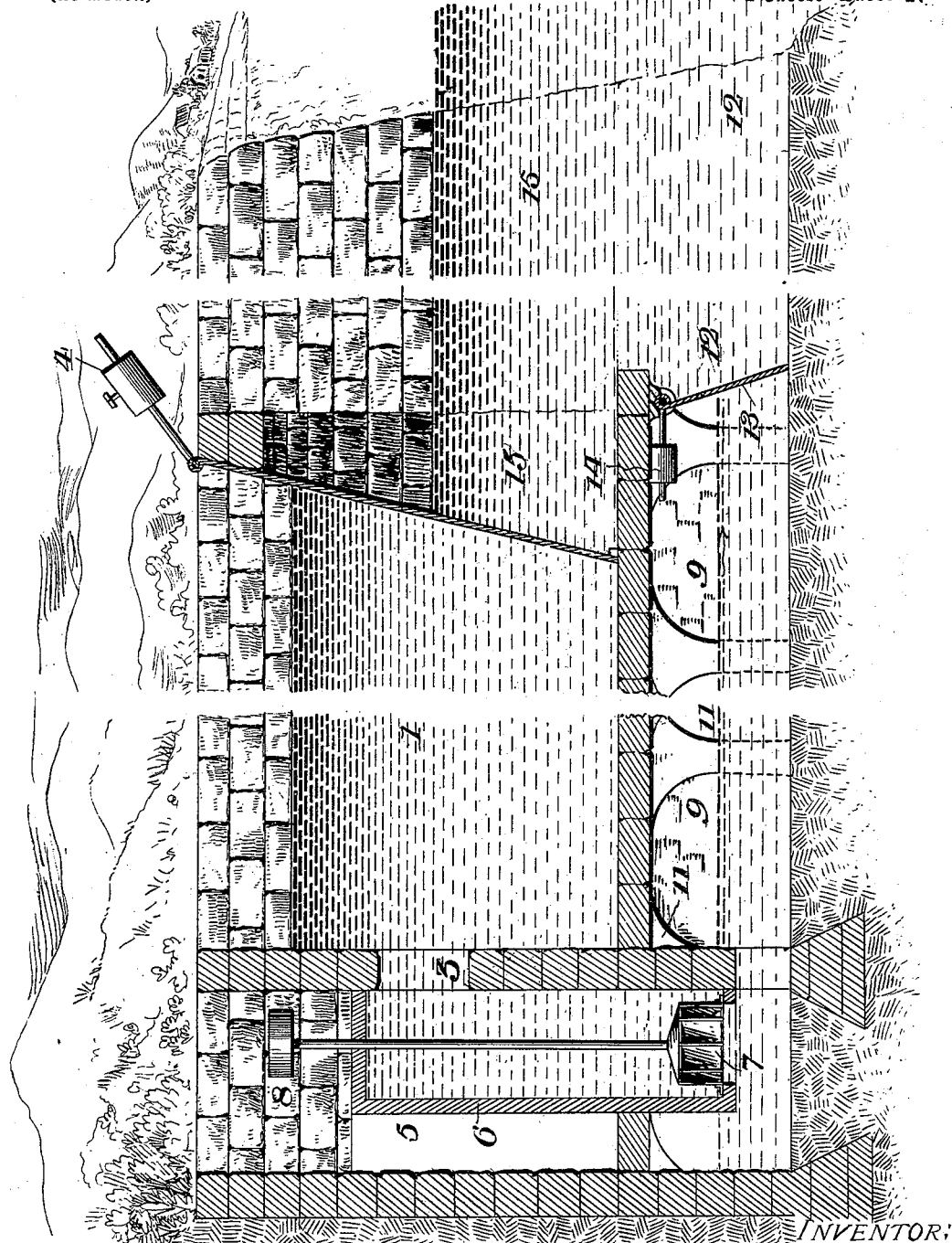

UNITED STATES PATENT OFFICE.

MELVIN D. COMPTON, OF EAST ORANGE, NEW JERSEY.

TIDE-POWER.

SPECIFICATION forming part of Letters Patent No. 647,944, dated April 24, 1900.

Application filed January 22, 1900. Serial No. 2,331. (No model.)

*To all whom it may concern:*

Be it known that I, MELVIN D. COMPTON, a citizen of the United States, residing at the city of East Orange, in the county of Essex and State of New Jersey, have invented a certain new and useful Tide-Power, of which the following is a specification, reference being had therein to the accompanying drawings.

This invention relates to tide-powers.

The object of the invention is to utilize the head of water due to the difference of level between low or ebb and high or flood tide.

The invention consists in the construction and assemblage of reservoir, basin, and inclosure, and to said structures and appurtenances hereinafter described and claimed.

In the drawings, Figure 1 is a plan. Fig. 2 is a section on the line 2 2 of Fig. 1. Fig. 3 is a detail section on the line 3 3 of Fig. 1, showing my invention.

1 is an impounding-reservoir of large area having suitable inclosing banks and walls. This reservoir is provided with one or more inlet-gates 2 and with one or more discharge passages or flumes 3. The inlet-gate is suspended, as shown, to automatically open and admit water at flood-tide and to close as the tide recedes. An adjustable weight 4 is applied to the gate to partially counterbalance the same and thereby provide for the free entrance of water to the reservoir.

5 is a motor-inclosure, the same being a compartment alongside the reservoir, having massive walls for excluding water and within which are arranged one or more individual motor inclosures or penstocks 6 and such shafting and machinery as may be desired. Within each of the penstocks are mounted one or more motors 7, each provided with the usual shaft and driving-pulley 8. The tail-water from the motors falls into a receiving and discharging basin 9, arranged, by preference, beneath the motor and the impounding-reservoir, the bottom of this basin being about on the plane of low-tide water. This basin is of large capacity to receive and store water used for driving motors during a tide period.

In the embodiment of my invention shown in the drawings the receiving and discharging basin 9 is arranged within a water-basin beneath the impounding-reservoir, a water-tight floor 10 being supported between the reservoir and basin by suitable pillars 11 11 and arches, as shown, or this floor may be constructed of metallic girders with arches between them in a well-known manner.

Leading from the basin are one or more ports or canals 12, each provided with an automatic check-gate 13 to permit the free exit of water at low tide and exclude tide-water. This gate 13 has an adjustable counterweight 14 to make its operation free and easy.

As shown in the drawings, the impounding-reservoir is land-locked, and a discharging-canal 12 is shown leading from the basin to open water and a feeding-canal 15 leading from open water to the reservoir above the discharge-passage.

Obviously the discharging and feeding canals will be of large capacity or there will be a plurality of them to efficiently drain the basin and supply the reservoir. It is also obvious that the receiving and discharging basin may be arranged alongside the reservoir and motor-inclosure when the topography of the place is favorable or whenever the same may be desirable without departing from my invention.

Having described my invention, I claim—

1. A tide-power embracing the combination of a reservoir and appliances for automatically admitting and impounding water at high tide and dispensing the same at any time as required for use, a basin of large capacity to receive water from motors at any time and automatically discharge the same at low tide, a separate motor-inclosure, and one or more motors located in said inclosure at as low a level as will permit the free discharge of tail-water.

2. A tide-power embracing the combination of an impounding-reservoir having an automatic opening and closing gate and a discharging-flume, a receiving and discharging basin having an automatic closing and opening gate, a separate motor-inclosure alongside the reservoir and basin and a plurality of motors located in said inclosure at as low a level as will permit of the free discharge of tail-water.

In testimony whereof I affix my signature in presence of two witnesses.

MELVIN D. COMPTON.

Witnesses:
ROBERT S. DOWNS,
V. D. STOCKBRIDGE.